US012254847B2

(12) United States Patent
Shi et al.

(10) Patent No.: US 12,254,847 B2
(45) Date of Patent: Mar. 18, 2025

(54) HIGH IMPEDANCE DRIVER FOR BI-STABLE AND MULTI-STABLE DISPLAYS AND METHOD TO DRIVE SAME

(71) Applicant: New Vision Display, Inc., Roseville, CA (US)

(72) Inventors: Quanshui Shi, Shenzhen (CN); Steve Beldon, Malvern (GB)

(73) Assignee: New Vision Display, Inc., Roseville, CA (US)

( * ) Notice: Subject to any disclaimer, the term of this patent is extended or adjusted under 35 U.S.C. 154(b) by 0 days.

(21) Appl. No.: 17/973,298

(22) Filed: Oct. 25, 2022

(65) Prior Publication Data

US 2023/0131155 A1 Apr. 27, 2023

Related U.S. Application Data

(60) Provisional application No. 63/272,337, filed on Oct. 27, 2021.

(51) Int. Cl.
*G09G 3/36* (2006.01)

(52) U.S. Cl.
CPC ......... *G09G 3/3622* (2013.01); *G09G 3/3629* (2013.01); *G09G 3/3681* (2013.01); *G09G 3/3692* (2013.01); *G09G 2310/08* (2013.01); *G09G 2320/0257* (2013.01); *G09G 2330/021* (2013.01); *G09G 2330/023* (2013.01)

(58) Field of Classification Search
CPC ...... G09G 3/36; G09G 3/3622; G09G 3/3629; G09G 3/3681; G09G 3/3692; G09G 2310/08; G09G 2320/0257; G09G 2330/021; G09G 2330/023
See application file for complete search history.

(56) References Cited

U.S. PATENT DOCUMENTS

2010/0149168 A1* 6/2010 Thomas ............... G09G 3/3629 345/100

* cited by examiner

*Primary Examiner* — Robin J Mishler
*Assistant Examiner* — Cory A Almeida
(74) *Attorney, Agent, or Firm* — Weintraub Tobin; Jo Carothers

(57) ABSTRACT

A method to drive bi-stable liquid crystal displays and related drivers and displays using same are disclosed. The method and driver use additional high impedance states of the outputs to save power while addressing bi-stable and multi-stable liquid crystal displays. The invention implements high impedance states at the driver outputs, allowing non-addressed sections of the display to electrically “float” and by doing so reduces the required power to drive the display. Other advantages include improved visual effect of an update, such as reduced flash during the update, simpler operation, and better yields due to a larger operating window.

22 Claims, 10 Drawing Sheets

900

| | | Relative power consumption | | |
|---|---|---|---|---|
| NO# | Display Pattern | SEG & COM floating - 510 | COM floating - 520 | Normal - 530 |
| 550 | White all pixel off (pattern1) | 8% | 50% | 100% |
| 560 | chequerboard (pattern2) | 46% | 60% | 100% |
| 570 | all pixel on (pattern3) | 49% | 49% | 100% |
| 580 | Blanking | 61% | 61% | 100% |

*FIG. 9*

1200

| Image | Energy (mJ) | | |
|---|---|---|---|
| | Seg&Com Float | Com Float | Normal |
| 1 x 1 CB | 85.9 | 80.7 | 81.5 |
| Black | 57.5 | 57.8 | 128.3 |
| White | 59.9 | 60.9 | 128.1 |
| Image | 84.6 | 78.8 | 128.2 |

*FIG. 12*

1300

| Image | Relative power consumption | | |
|---|---|---|---|
| | Seg&Com Float | Com Float | Normal |
| 1 x 1 CB | 105 | 99 | 100 |
| Black | 45 | 45 | 100 |
| White | 47 | 48 | 100 |
| Image | 66 | 61 | 100 |

*FIG. 13*

HIGH IMPEDANCE DRIVER FOR BI-STABLE AND MULTI-STABLE DISPLAYS AND METHOD TO DRIVE SAME

CROSS-REFERENCE TO RELATED APPLICATION

This application claims priority under 35 U.S.C. Section 119(e) to U.S. Provisional Patent Application No. 63/272, 337, entitled "High Impedance Driver for Bi-Stable and Multi-Stable Displays and Method to Drive Same" and filed on Oct. 27, 2021, the entire disclosure of which is incorporated herein by reference.

FIELD OF THE INVENTION

The present invention and disclosure are generally directed to a new and novel method to drive electronic displays and an associated display driver.

BACKGROUND OF THE INVENTION

Liquid crystal displays (LCDs) are currently being addressed by scanning one or more rows (also referred to as "Commons" or "COMs") at a time while applying the appropriate signal to columns (also referred to as "Segments" or "SEGs"). This causes an LCDs' pixels or areas of other predetermined shape to adopt the desired state.

In regular LCDs, this scanning must continue uninterrupted for as long as an image needs to be shown on the display. In contrast, in bi-stable or multi-stable LCDs, the scanning can be stopped or significantly slowed down once an image has been written onto the display. Addressing by scanning one row at a time is often referred to as multiplexed addressing, or if several rows at a time are scanned simultaneously it is often referred to as active addressing.

Multiplexing is the action of applying data on the columns while either a single row or multiple groups of rows are addressed sequentially. Multiplexing can be applied to both regular LCDs and bi-stable or multi-stable LCDs. However, in regular LCDs that are not bi-stable or multi-stable LCDs, multiplexing and active addressing requires a threshold under which an applied electric stimulus does not affect the LCD. Regular LCDs further require a minimum steepness of transition, which is defined by how strongly the optical effect changes, once the LCD reacts to a change in the strength of the stimulus after the threshold has been passed. Finally, regular LCDs also require a non-instantaneous relaxation time for the LCD once it has been addressed.

The relationships between the threshold, the steepness of transition, and the non-instantaneous relaxation time determine the total number of rows that can be addressed by multiplexing regular LCDs. If needed, a higher threshold voltage or steeper electro-optical response can be created by adding switching elements in addition to the liquid crystal to each pixel. Such switching elements can be thin film transistors ("TFT") or metal insulator metal diodes ("MIMs"). Displays using such elements are known as active matrix displays.

In bi-stable or multi-stable LCD displays, the non-instantaneous relaxation is very slow compared to the addressing time of the display. In the ideal case, the relaxation time is infinite, which produces true stability. In some cases, the bi-stability or multi-stability occurs upon removing the electric stimulus. These displays may respond instantaneously to the electrical stimulus, but after relaxing quickly into one of a plurality of states, further relaxation out of such states is very slow compared to the addressing time. For truly bi-stable or multi-stable displays, in other words those with infinite relaxation time, the number of addressable rows is also unlimited as long as there is a sufficiently high threshold such that column voltages will not impact the state of already written rows.

Thus, each pixel in truly bi-stable LCDs may relax instantaneously into either of the two stable states once the display has been addressed and the voltages are disconnected and then remain there indefinitely. During addressing, in other words while the voltages are applied, the final state may not be observable.

Bi-stable and multi-stable LCDs with along but finite response time can be dealt with by occasionally refreshing the displayed image before a noticeable contrast degradation occurs. In addition to the lower power requirement for bi-stable and multi-stable LCDs that do not require constant refreshing, the number of rows that can be addressed increases with less frequent refreshing.

Liquid crystals respond, depending on their type and their director configuration, to an applied electric field or the root mean square ("RMS") voltage equivalent of an applied alternating electric field. Applying a direct current ("DC") field is not desirable as a constant net DC field can lead to unwanted side effects such as separation and electro-migration of charge carriers, electro-corrosion of display elements, and it may eventually lead to electro-chemically induced decomposition of the liquid crystal itself. To avoid a constantly applied net DC field, the display is typically addressed with alternating positive and negative polarity signals.

Passive matrix displays are those displays that do not rely on active switching elements such as thin film transistors or diodes. Passive matrix row drivers address one or more rows at a time in a scanning fashion with a high-voltage pulse of one polarity while all other rows are held at a low or zero voltage. In the subsequent refresh, each row is addressed in the same fashion with the opposite polarity pulse.

For black and white, the column drivers may apply a higher and lower voltage or a lower and higher voltage, respectively. The column voltages also change in polarity as synchronized with the row signal's polarity. Each overlap of a row and column forms a pixel, which electrically acts as a capacitor with the liquid crystal being its dielectric. The pixel capacitor "integrates" the applied signal, which consists of the signal during the time the row is addressed and all the signals from the column drivers during the time other rows are being addressed. Some liquid crystal layers may respond to the "integrated" signal in the form of its RMS voltage, which is independent of polarity, while others may also be sensitive to and respond to the polarity of the applied signal.

It is also common for passive matrix row and column drivers to be offset in voltage so the magnitude of the voltage is shared across both drivers. For example, an active row may require a bipolar pulse of −30V/+30V and column data may require a bipolar pulse of +5V/−5V for a select pixel, providing a resultant bipolar pulse across the pixel of 35V/+35V. This requires a row driver that is capable of achieving a large range of output voltages from −30V to +30V, which is a 60V range. By offsetting the voltages supplied to both row and column drivers, the same resultant can be applied to the pixel by applying 0V/+35V to the active row while applying +35V/0V to a column for a select pixel or +10V/+25V for a non-select pixel. This now requires both row and column drivers that are capable of supplying the voltage span of zero to +35V. This method is termed "voltage reduction" and greatly reduces the cost and complexity of the display drivers.

All rows and all columns are at all times addressed with certain voltage levels, which change both with image content and due to the alternating polarity. Each pixel in a row is electrically parallel with each other pixel in that row, and each row is electrically parallel with each other row being addressed. Hence, the entire display forms a large capacitor, which is equivalent to the sum of all the pixel capacitors. Charging and discharging this entire capacitor with alternating polarity signals on a continuous basis requires electrical power.

In the case of bi-stable or multi-stable displays, the power requirement is lower as the display does not have to be continuously addressed. Therefore, such displays are especially useful in battery-operated devices that cannot easily be recharged on a frequent basis. For such displays, a further reduction in power for each separate image update is desirable as it increases the number of available image updates per battery charge or during the battery's lifetime.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Passive matrix row and column drivers having the ability to hold multiple outputs in a high impedance state are disclosed.

In another embodiment, a combined row and column driver with or without an integrated timing controller and with the ability to hold a plurality of outputs in a high impedance state is disclosed.

A method for reducing the power requirement for a single image update in a bi-stable or multi-stable passive matrix display by employing matrix addressing with floating or high impedance row and column outputs is also disclosed.

In a further embodiment, a novel method for bipolar addressing utilizing the redundancy of data voltage is also disclosed. As disclosed herein, when a row driver applies a high voltage pulse to a single row or multiple rows simultaneously while all other row outputs are held at high impedance, the resulting capacitive load for the drivers is substantially the sum of the capacitances of only those pixels in the addressed rows, not all the pixels of the array. All the other pixels are electrically floating capacitors that take on an intermediate voltage, which is defined by a multitude of possible capacitive voltage dividers formed by the display matrix.

If such intermediate voltages are small compared to the threshold voltage at which the liquid crystal changes state, there is no detrimental impact on the image quality. Further, such an addressing scheme without full control of pixel voltages may cause a small residual DC voltage despite polarity inversion in the drive signals. However, such DC voltage is small and only temporary as it discharges through the display after addressing is stopped. A sufficiently small DC voltage below the electro-chemical potential for possible redox reactions will not damage the display, and if the duration of the applied DC voltage is short, no significant detrimental image quality effects, such as retention of ghost images, will result.

Thus, the detrimental effects of high impedance row driving remain below the threshold for concern, and driving only one row or a few rows at a time reduces the capacitive load of the addressing circuit by the number of rows driven divided by the sum of the total number of rows and stray capacitances.

High impedance row driving can be applied, in various embodiments, for bi-stable and multi-stable displays such as bi-stable nematic (Binem) displays, Zenithal bi-stable (ZBD) displays or cholesteric liquid crystal (ChLCD) displays. However, in alternative embodiments, other passive matrix displays can also be used.

In another embodiment, this invention and disclosure can also be applied to high impedance addressing with column drivers. In this embodiment, the addressing and the power benefits depend on the image content. For example, if a white pixel requires no or only a small voltage while a black pixel requires a large voltage, the column driver could alternate between driving the voltage for turning a pixel black and holding the driver output at high impedance when pixels can be allowed to remain white.

In another embodiment, this invention and disclosure can also be applied to high impedance addressing with both row and column drivers simultaneously.

In a further embodiment, this invention and disclosure allows a novel addressing method where positive and negative voltages are applied by both the row and column drivers synchronously, meaning the voltage pulses are in sync but the pulses can be any combination of positive and/or negative voltages. This leads to a reduction of the previously applied peak amplitudes of the row and column signals to half their original values.

Since the voltage applied to the electrode opposite to a high impedance or floating electrode is now halved, it results in a lower voltage that the floating electrodes tend towards. As a result, the impact of the FLOAT voltage levels on the performance of a bi-stable display are further reduced.

Thus, a new and novel method to drive bi-stable and multi-stable liquid crystal displays and an associated driver are disclosed. More specifically, the invention relates to the method of implementing high impedance states at the driver outputs, allowing non-addressed sections of the display to electrically "float", and by doing so reduce the required power to drive the display. Other possible advantages include improved visual effect of an update such as reduced flash during an update, simpler operation, and better yields due to a larger operating window.

Accordingly, one or more embodiments of the present invention overcomes one or more of the shortcomings of the known prior art.

For example, in one embodiment, a method is disclosed for addressing a passive matrix liquid crystal display comprising providing a plurality of pixels, wherein the plurality of pixels is arranged into a plurality of rows and a plurality of columns to form an array, and wherein each pixel in the plurality of pixels comprises a plurality of liquid crystal molecules, and wherein an electric signal applied to one of the plurality of rows and one of the plurality of columns creates an electric field across plurality of liquid crystal molecules of each pixel in the plurality of pixels at an intersection of the one of the plurality of rows and the one of the plurality of columns; providing a row driver comprising a plurality of row outputs; providing a column driver comprising a plurality of column outputs; outputting a row signal on at least one of the plurality of row outputs; outputting a column signal on at least one of the plurality of column outputs; driving a target image using the row signal and the column signal; setting at least one of the plurality of row outputs or at least one of the plurality of column outputs to a high impedance state; and addressing the passive matrix liquid crystal display by applying a voltage to at least one of the plurality of pixels within the array.

In this embodiment, the method can further comprise wherein the row driver and the column driver are integrated into a display driver; wherein at least one of the plurality of row outputs assumes a high impedance state when at least one column is addressed; wherein at least one of the plurality of column outputs assumes a high impedance state when at least one row is addressed; wherein at least one of the plurality of row outputs and at least one of the plurality of column outputs assume a high impedance state when at least one row is addressed; further comprising applying a positive voltage and a negative voltage to the plurality of rows and the plurality of columns, and applying a voltage reduction to reduce the required active row and column voltage swing; wherein the passive matrix liquid crystal display is a zenithal bi-stable display; wherein the passive matrix liquid crystal display is a cholesteric liquid crystal display; or further comprising providing an external stimulus and selecting a high impedance state based on the external stimulus; wherein the external stimulus is an environmental operating parameter.

In another example embodiment, a low power passive matrix liquid crystal display is disclosed comprising a plurality of pixels, wherein the plurality of pixels is arranged into a plurality of rows and a plurality of columns to form an array; each pixel in the plurality of pixels comprises a plurality of liquid crystal molecules, and an electric signal applied to one of the plurality of rows and one of the plurality of columns creates an electric field across plurality of liquid crystal molecules of each pixel in the plurality of pixels at an intersection of the one of the plurality of rows and the one of the plurality of columns; a row driver comprising a plurality of row outputs, wherein the row driver outputs a row signal on at least one of the plurality of row outputs; a column driver comprising a plurality of column outputs, wherein the column driver outputs a column signal on at least one of the plurality of column outputs; and wherein at least one of the plurality of row outputs or one of the plurality of column outputs assumes a high impedance state while applying a voltage to at least one of the plurality of pixels within the array to address the low power passive matrix liquid crystal display.

In this embodiment, the display can further comprise wherein the plurality of row drivers and the plurality of column drivers is an integrated row and column driver; wherein the integrated row and column driver further comprises an integrated display; wherein the low power passive matrix liquid crystal display is a bi-stable display; wherein the low power passive matrix liquid crystal display is a multi-stable display; wherein the low power passive matrix liquid crystal display is a zenithal bi-stable display; wherein the low power passive matrix liquid crystal display is a cholesteric liquid crystal display; further comprising a plurality of modes of operation selected from the group consisting of high impedance row addressing, high impedance column addressing, high impedance row and column addressing, and standard no high impedance addressing, and wherein the plurality of modes of operation are selected based on an external stimulus; or wherein the external stimulus is an environmental operating parameter.

In another example embodiment, a liquid crystal display driver for a passive matrix liquid crystal display is disclosed comprising a row driver comprising a plurality of row outputs; a column driver comprising a plurality of column outputs; and wherein at least one of the plurality of row outputs or one of the plurality of column outputs assumes a high impedance state while addressing a low power passive matrix liquid crystal display.

In this embodiment, the liquid crystal display driver can further comprise an integrated display and a timing controller; or further comprising at least two selectable modes of operation for determining whether high impedance addressing is used for rows, columns, rows and columns, or neither rows nor columns.

Other objects, features, and advantages of the present invention will become apparent upon consideration of the following detailed description and the accompanying drawings.

BRIEF DESCRIPTION OF THE DRAWINGS

FIG. 9 shows a table of example relative power consumption under different addressing modes and images.

FIG. 12 shows a table of example absolute power consumption under different addressing modes and images using an integrated circuit.

FIG. 13 shows a further table of example relative power consumption under different addressing modes and images using an integrated circuit.

DETAILED DESCRIPTION OF THE INVENTION

The following is a detailed description of various embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

As used herein, the terms “row-”, “common-”, “coms-”, such as in row electrode, row signal, or row driver shall mean pertaining to the group of items such as electrodes, drivers, outputs, or signals, that are involved with scanning one or a few rows at a time until each have been scanned once during a frame time. The terms “column-”, “segment-”, “seg-”, such as in column electrode, columnsignal, or columndriver shall mean pertaining to the group of items such as electrodes, drivers, outputs, or signals that are involved in determining the resulting state the pixel will adopt. The terms “select-” and “sel-” as in select state, select voltage, or select signal and “non-select-”, “n-sel” as in non-select state, non-select voltage, or non-select signal, shall mean pertaining to an item such as state, voltage, or signal, that relates to one of two final states of the pixel. Whether or not select will lead to a bright or a dark pixel is determined by the optical configuration. “Select-” and “non-select-” may differ in voltage level, polarity, or a specific or inverted sequence of pulses. A “select” voltage turns a pixel “On,” a “non-select” voltage turns a pixel “Off.” “On” can mean bright or dark, depending on the optical configuration, and “Off” is the opposite of “On.”

Equivalent Circuit 100 for a Two-by-Two Pixel Display

Figure 1:
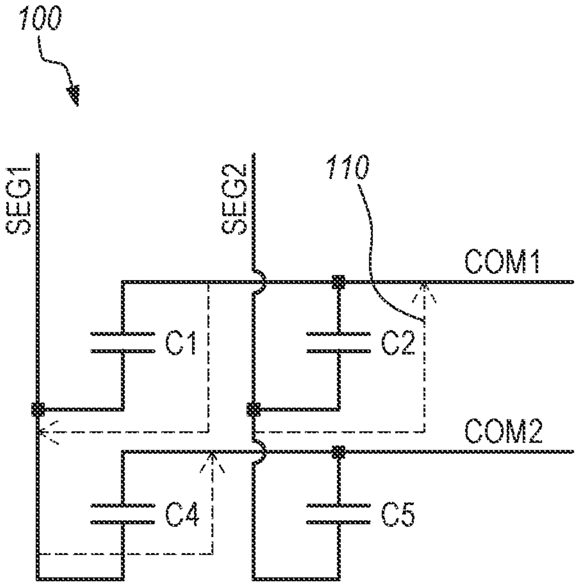
FIG. 1 shows an equivalent capacitor circuit for a two-by-two pixels display.
Figure 2:
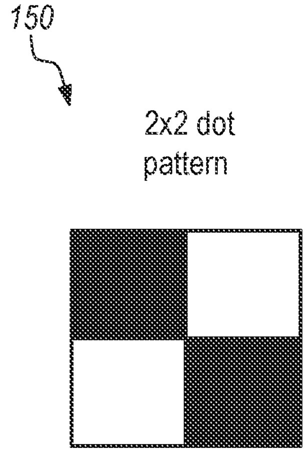
FIG. 2 shows an example of a two-by-two pixels display.

FIG. 1 illustrates equivalent circuit 100 for a two-by-two pixels display 150, as shown in FIG. 2.

Equivalent circuit 100 includes columns SEG1 and SEG2, rows COM1 and COM2, and pixel capacitors C1, C2, C4, and C5. FIG. 1 further shows example path 110 for electrical charge to flow to SEG1 and COM1 when a high impedance state is applied to inactive columns and rows, such as where only COM2 and SEG2 are active. In other embodiments, such as for larger LCDs with larger pixel counts, the principles as disclosed herein are the same, except that there will be multiple charge paths. Thus, the principles as disclosed herein apply to any other matrix of larger dimensions, for example a 6×14 or a 480×360 or any other matrix in landscape, portrait or square format. As one of skill in the art would understand, for these larger matrix displays there are many and more complex capacitive charge divider paths involving series of pixel capacitors between floating rows and columns and terminating at the driven row and column, analogous to the path 110 shown for equivalent circuit 100.

A display driver according to this invention needs to be able to output specific voltage levels or settings, such as 0V/GND, 5V, 20V, or other voltages at some of the common and segment driver outputs, while other common and/or segment outputs are held at a high impedance state, thus allowing the voltages on the corresponding rows and columns to float.

Figure 3:
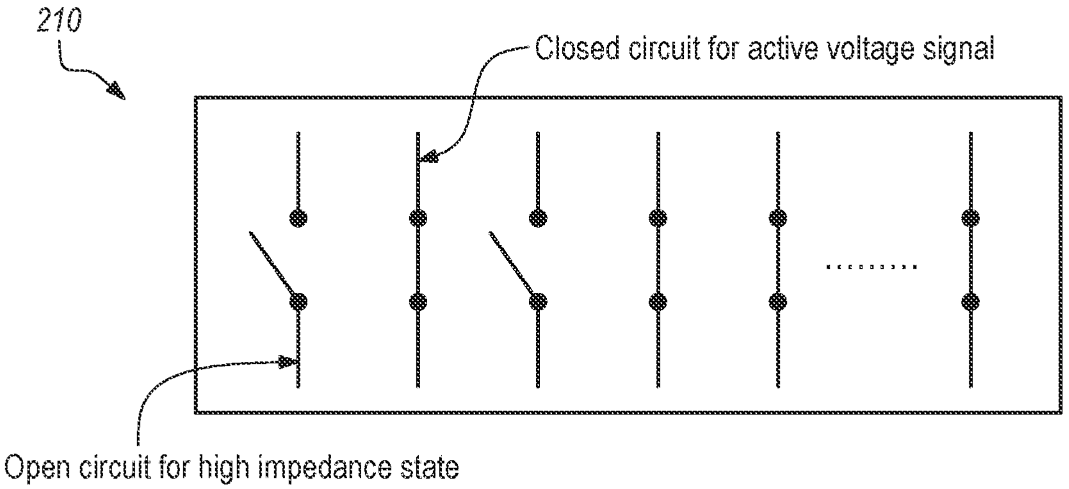
FIG. 3 shows an example embodiment of a linear switch array that can be used to achieve a high impedance state at the output of a driver.
Figure 4:
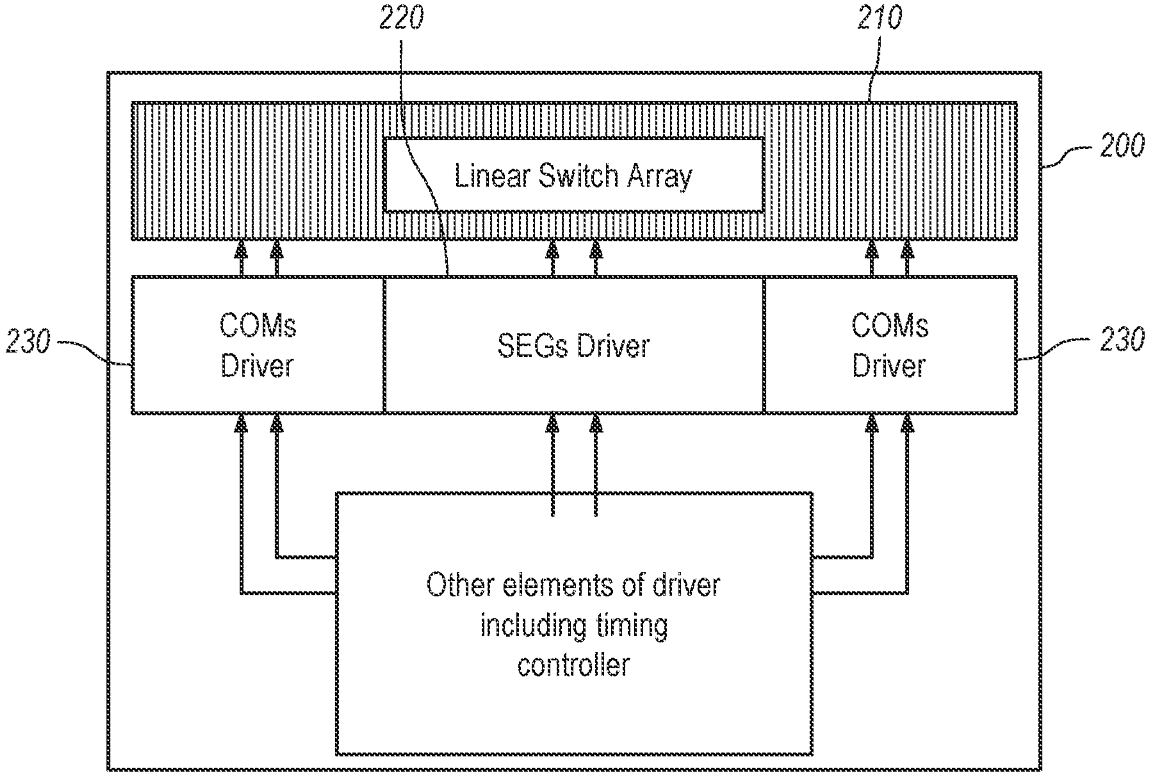
FIG. 4 shows a block diagram of an example embodiment of a display driver including the linear switch array of FIG. 3.

FIG. 4 illustrates a block diagram of an example display driver 200 including linear switch array 210, column driver 220, and row driver 230 that may be used to drive a display. FIG. 3 illustrates linear switch array 210 within display driver 200 that can enable a high impedance state to be applied to any given row or column driver output.

In alternative embodiments, some display drivers are not integrated with both COM and SEG driver functions, but are specialized COM drivers and specialized SEG drivers. The same concept applies to these types of drivers. Adding, for example, a linear switch array to a dedicated COM or SEG driver will allow such modified drivers to be used for this invention.

For example, in one embodiment as shown in FIG. 1, a column driver 220 (as shown in FIG. 4) applies a voltage pulse to the column SEG2, while a row driver 230 (as shown in FIG. 4) applies another voltage pulse to the row COM2. COM1 and SEG1 are floating, as the column driver 220 and the row driver 230 hold the corresponding outputs at high impedance. As a result, the potential difference between COM2 and SEG2 is directly applied to pixel capacitor C5 and is divided across pixel capacitors C1, C2, and C4 in path 110.

The resulting capacitance between the row driver 230 and the column driver 220 is substantially the capacitance of C5, which experiences the full voltage differential, as all other pixel capacitors C1, C2 and C4 are floating and the voltages across C1, C2 and C4 are smaller and defined by various possible capacitive voltage dividers formed by a larger display matrix.

Further, as with the simplified embodiment shown in FIG. 1, such a capacitive voltage divider may be the capacitance between the driven column SEG2 to floating row COM1, and from there to floating column SEG1 and from there back to the driven row COM2. In other embodiments, other such paths are possible in a larger display matrix. The resulting voltage levels on all the pixels of the undriven rows depend on the image that is being displayed. And, if such voltage differences are small compared to the threshold voltage at which the liquid crystal changes state, there is no detrimental impact on the image quality.

Further, such an addressing scheme without full control of pixel voltages, meaning control over when they are allowed to float, may cause a small residual DC voltage despite polarity inversion in the drive signals. However, such DC voltage is small and only temporary as it discharges through the display after addressing is stopped.

A sufficiently small DC voltage below the electrochemical potential for possible redox reactions will not damage the display and if the duration of the applied DC voltage is short, no significant detrimental image quality effects, such as retention of ghost images, will result. This addressing scheme may be designed within the display driver 200 function that provides the relevant voltage and high impedance states that allow the present invention to be applied, in various embodiments, for bi-stable and multi-stable displays such as Binem (bistable nematic) displays, ZBD (Zenithal bistable) displays or ChLCD (cholesteric liquid crystal) displays. However, in alternative embodiments, other passive matrix type displays may be used.

Thus, the detrimental effects of high impedance row driving remain below a threshold at which they are of concern. And, driving only one row or a few rows at a time while holding all other rows at high impedance reduces the capacitive load of the addressing circuit by the number of rows driven divided by the total number of rows plus stray capacitances.

In other embodiments, the same concept can be applied to high impedance addressing with column drivers 220 where the addressing and the power benefits depend on the image content. For example, in one exemplary embodiment, if a white pixel requires zero volts or only a small voltage while a black pixel requires a large voltage, the column driver 220 could alternate between driving the voltage at the level for turning a pixel black and holding the output at high impedance.

Figure 5:
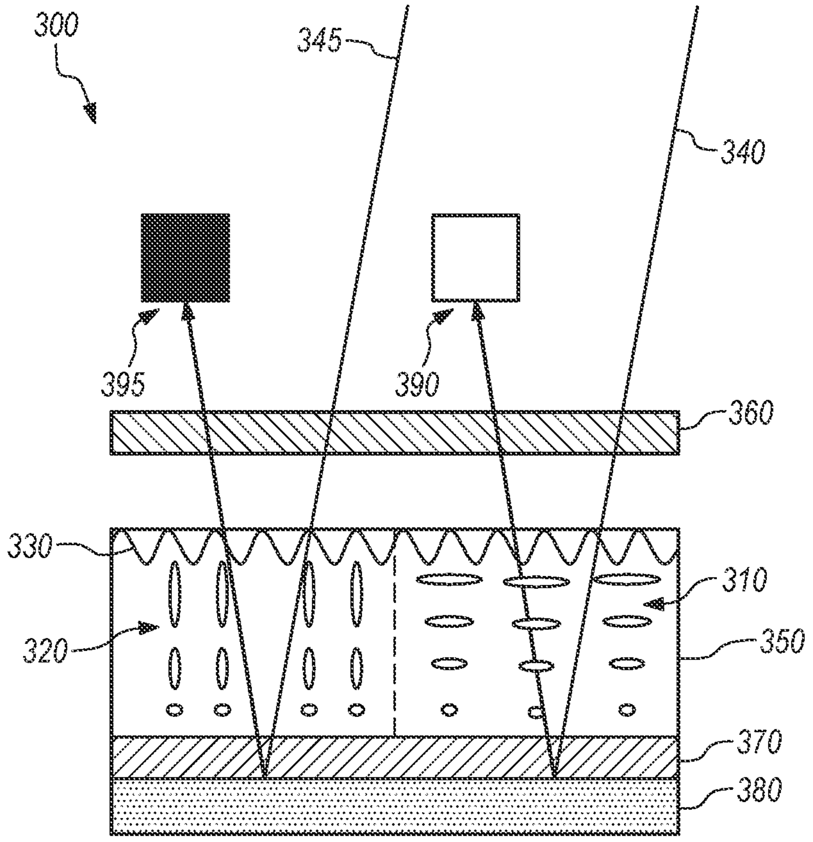
FIG. 5 shows the schematic of an example embodiment of a ZBD display in two polarizer reflective geometry.

In another example embodiment as shown in FIG. 5, a ZBD display 300 in crossed polarizer reflective configuration is shown. In ZBD display 300, grating 330 on one of the internal surfaces stabilizes two possible optical states, TN state 310 or HAN state 320. Ambient light 340 and 345 incident on ZBD display 300 is polarized by the front polarizer 360 and passes through the device. If the liquid crystal cell 350 is in the Defect or TN state 310, then this polarized light is rotated on both passes through the liquid crystal cell 350 via the rear polarizer 370 and reflector 380 that then provides a white state 390 on the second pass through the front polarizer 360. If the liquid crystal cell 350 is in the Continuous or HAN state 320 then the polarized light is not rotated and is absorbed by the rear polarizer 370 to provide the black state 395. Defect state and Continuous state refer to the specifics of the liquid crystal director configuration inside the liquid crystal cell, being either continuous or discontinuous, respectively, and thus allowing for bi-stability.

In this configuration, a two-field addressing scheme is used where the ZBD display 300 is fully latched (or blanked) into the all-white state 390 in the first field, before in a second field only those pixels that need to be black are changed. In the case of both the row COM2 and column SEG2 of display 150 being active, the given pixel is written and latched into the black state. For all cases with a row and/or column being inactive (floating), the pixel's state remains unchanged, e.g., white.

Figure 6:
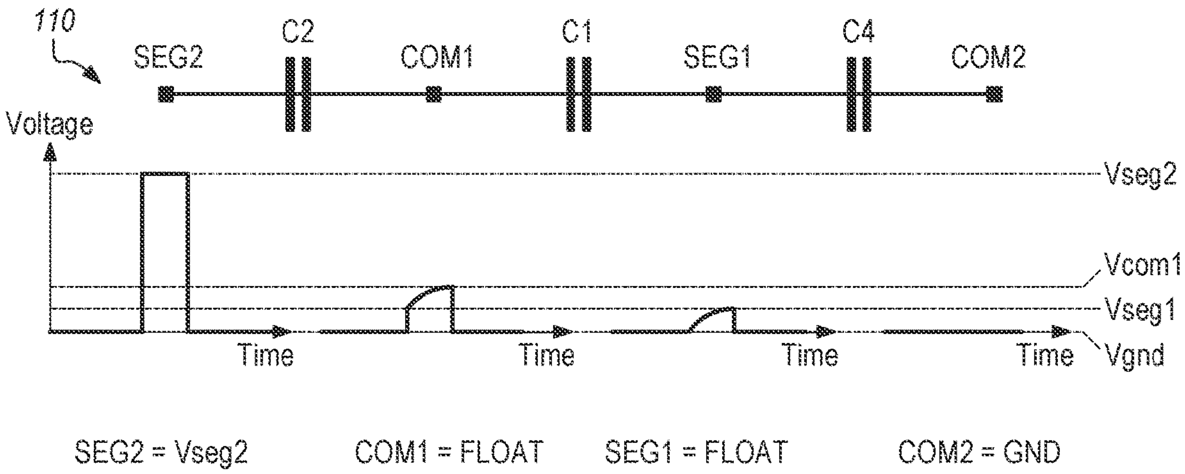
FIG. 6 shows an example embodiment of Path 110 with SEG2 and COM2 active and the effect of high impedance on COM1 and SEG1.

Turning to FIG. 6, charge path 110 is shown in a linear representation together with the expected resulting voltage levels at Com 1 and Seg 1. Column SEG2 is loaded with a voltage Vseg2 and row COM2 is held at zero volts, or ground. Both row COM1 and column SEG1 have a high impedance state or FLOAT voltage applied.

In various embodiments, the magnitude of the FLOAT voltage will vary from display to display, depending on the resistive and capacitive effects of the pixel within a given display. Also, the magnitude will be dependent upon the number of paths across the cell gap of the display and the voltages applied to adjacent "active" tracks.

Figure 7:
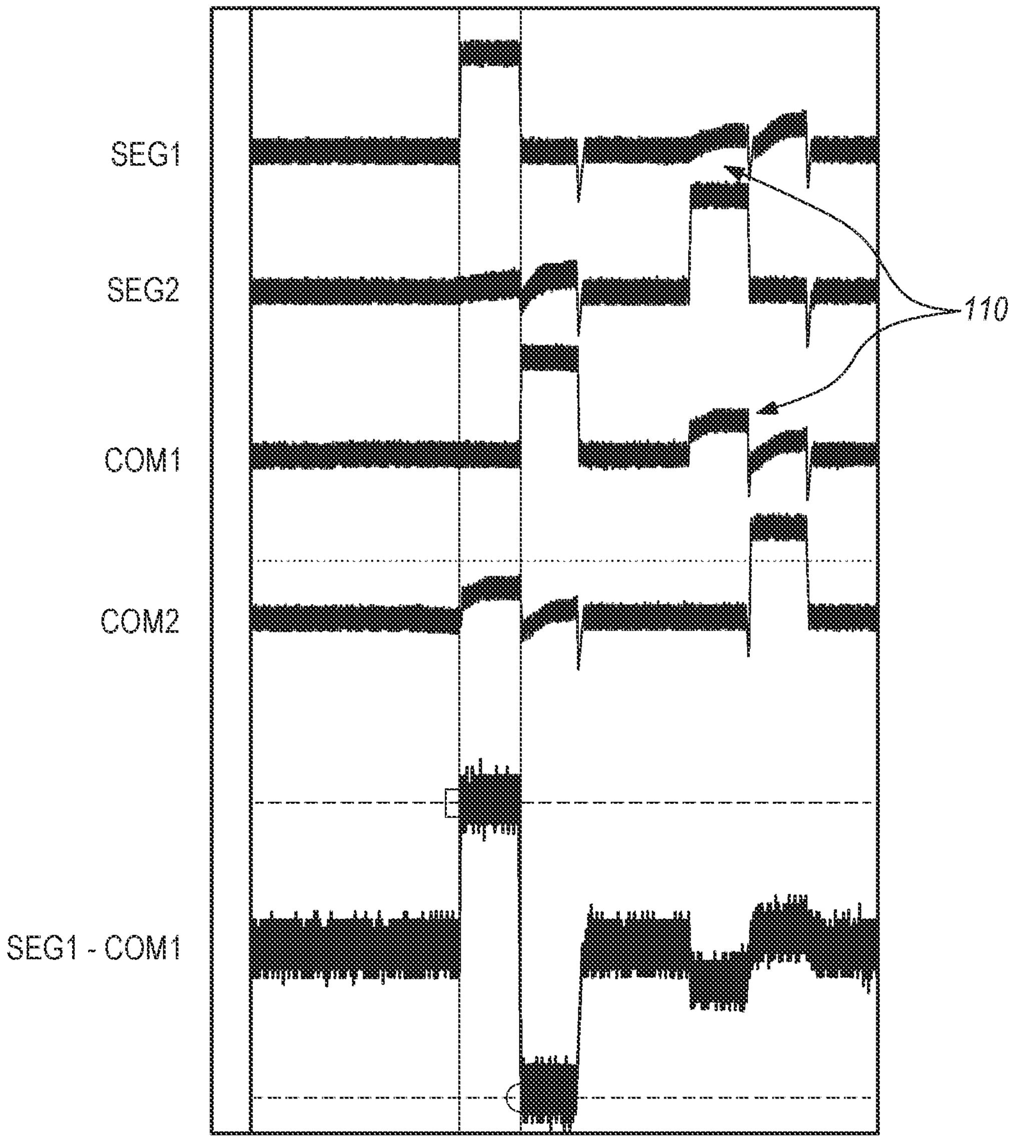
FIG. 7 shows oscilloscope traces for an example embodiment of a two-by-two pixels display when a FLOAT voltage is applied to inactive SEG and COM using a black and white checkerboard similar to that in FIG. 2.

FIG. 7 shows oscilloscope traces of the measured output of a two-by-two pixels display, such as display 150 (FIG. 2), while a black and white checkerboard image is updated. Oscilloscope traces are actual output results when applying a high impedance state (i.e. FLOAT voltage) to inactive rows and columns and bipolar pulses to active rows and columns as per the two-field addressing scheme normally applied to ZBD display 300 (FIG. 5) as shown in FIGS. 1 and 2.

The oscilloscope traces show some of the possible permutations and resultant voltages including the charge path 110 that follows the sequence SEG2-COM1-SEG1-COM2 in the case where SEG2 and COM2 are active and COM1 and SEG1 are inactive and therefore floating.

Figure 8:
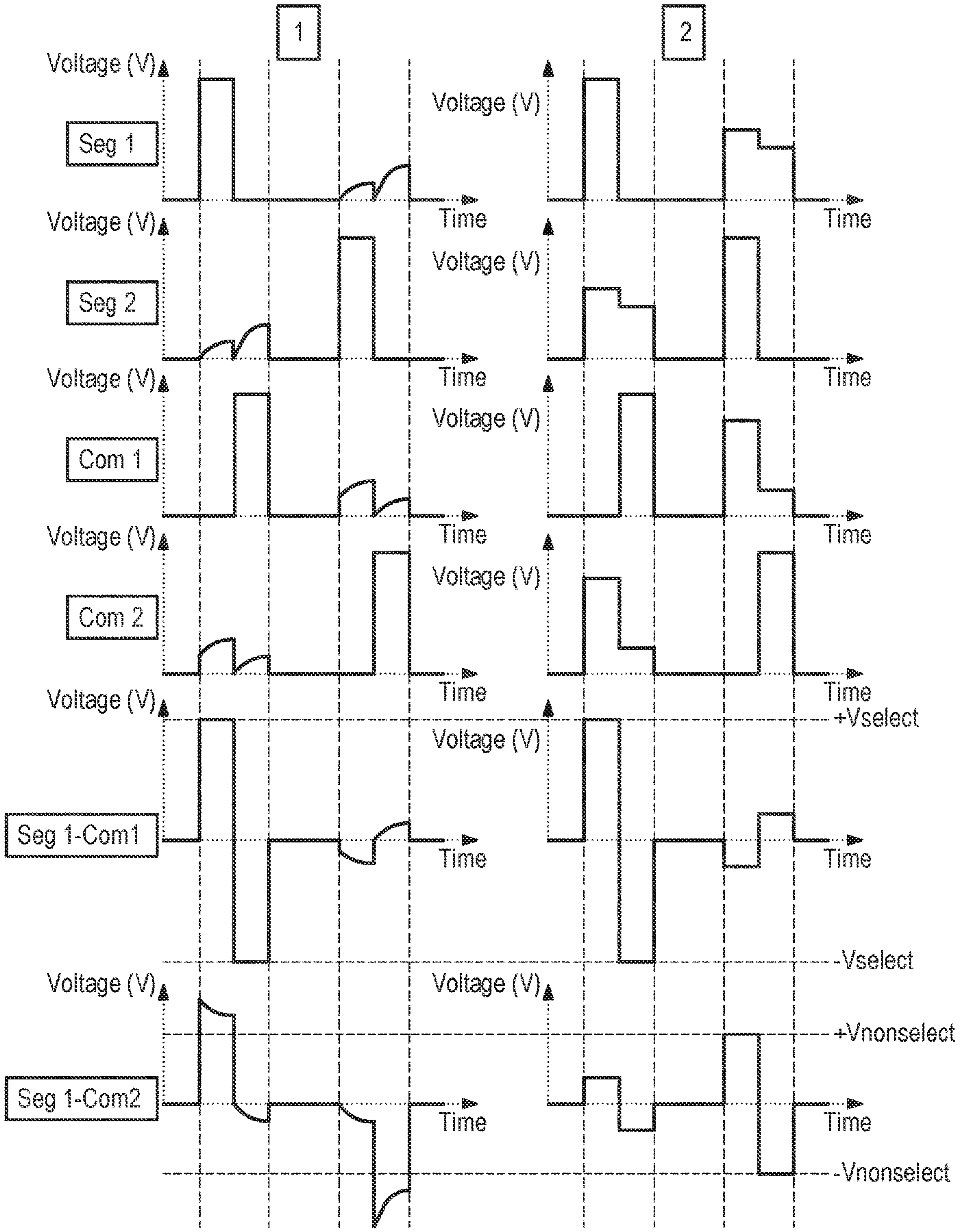
FIG. 8 shows a FLOAT voltage on both SEG and COM in Column [1] compared with standard addressing using typical values for non-select voltages in Column [2]. Both cases use the same values for active SEG and COM.

FIG. 8 illustrates a comparison of both COM and SEG traces as a function of time during the write phase of a black and white checkerboard in ZBD display 300 (FIG. 5) for high impedance (FLOAT) addressing in column 1 and for standard ZBD addressing in column 2. These illustrations use signal profiles derived from the measured signal profiles of the two-by-two pixels display, such as display 150 (FIG. 2), as shown in FIG. 7.

FIG. 8 also shows the resultant signal profile across pixel capacitor C1 (a black pixel) given by the differential SEG1−COM1 and pixel capacitor C4 (a white pixel) given by the differential SEG1−COM2.

In this example, where a FLOAT voltage is applied to inactive COM and SEG, there may be some effect on the operating window due to the large monopolar pulses shown in the resultant of [SEG1−COM2]. However, whether the effect on operating window is positive or negative will be dependent upon the parameters selected, such as data voltage under standard addressing, as well as display size and resolution. It is also expected that in the case of a FLOAT voltage applied to only inactive COM (rows) that there may be a more positive effect on the operating window.

FIG. 9 shows power savings table 900 summarizing the relative power savings for the different modes and images measured with a small test display and a using arbitrary function generators to create the row and column signals. High impedance outputs are truly disconnected during this measurement. The power consumption is shown for a display with resolution 6(SEG)×14(COM) while applying the three different modes: SEG & COM floating 510, COM floating 520, and under normal addressing mode 530. In this particular embodiment, results for three different images are illustrated where one image is all White 550, meaning all pixels are off or inactive, one image is a black and white checkerboard 560, and one image is all Black 570, meaning all pixels are on or active. Also measured is the blanking field only where the first field in the two-field scheme that blanks the display is fully White.

In a further embodiment, one of skill in the art would understand a custom driver can be designed in order to utilize float addressing on a full-sized display. One example embodiment of such a driver can use a ZBD LCD display containing 400×300 pixels with a size of 4.2 inches diagonal.

FIG. 12 shows absolute power consumption table 1200 summarizing power consumption data taken for this example embodiment of this ZBD LCD display using an integrated circuit. In this case, the data shown in table 1200 is the total power consumption for both the blank and selection fields.

FIG. 13 shows relative power consumption table 1300 summarizing power consumption data taken for this same example embodiment of this ZBD LCD display using an integrated circuit. Both absolute and relative update energy, as shown in FIGS. 12 and 13 respectively, is compared for a 1×1 checkerboard pattern, full white, full black, and a black text on white background image. The power saving is greatest for full white or full black images, while a 1×1 checkerboard pattern shows no saving.

Figure 10:
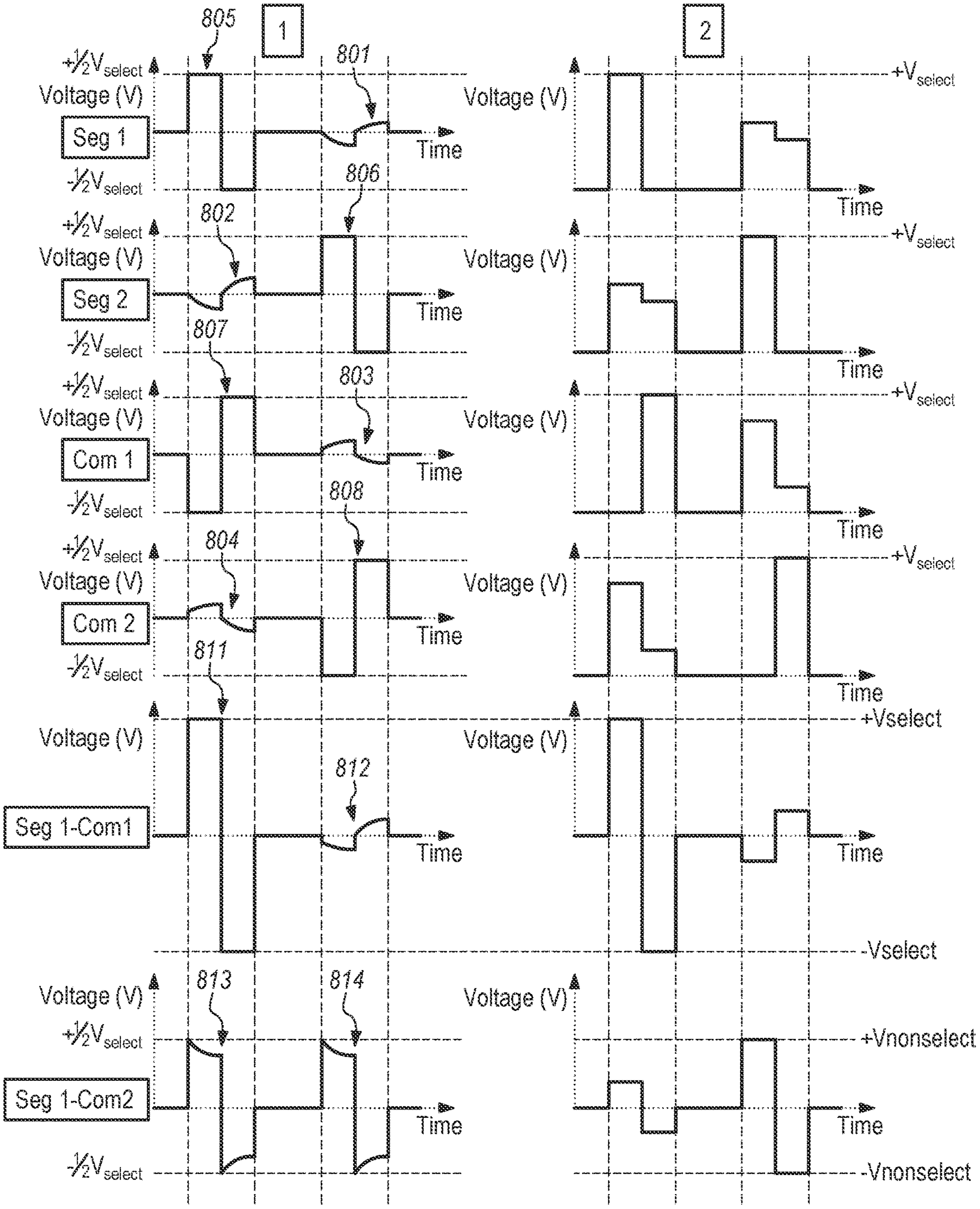
FIG. 10 shows an example embodiment of a method of addressing a bi-stable display utilizing a high impedance driver being applied to both inactive COM and SEG whereby all active pixel voltages are fully balanced across COM and SEG in Column [1], compared with standard addressing using typical values for non-select voltages in Column [2].

In a further embodiment, a novel method for bipolar addressing can be applied using a driver that is able to apply positive and negative voltages to both COM and SEG as well as a high impedance state. As data voltage is irrelevant in the case of a high impedance state being applied to inactive COMs and SEGs, it is possible to balance the active bipolar pulses across both the COM and SEG, thereby resulting in a reduction of up to half the voltage that would otherwise be applied to the electrode opposite a high impedance electrode. For example, pulse 805 in FIG. 10 shows one-half the amplitude compared to a similar location in FIG. 8. The consequence of this is that the floating electrode can tend towards a lower voltage level, but more importantly, the sign of the voltage will be the same sign as the potential applied to the adjacent "active" electrode.

An example of this method is illustrated in FIG. 10 in column 1, again compared to standard ZBD addressing in column 2 as reflected, for example, in U.S. Pat. No. 6,784,968. The high impedance state is applied to both inactive COMs and SEGs. Estimates of the floating voltage levels on the inactive COMs and SEGs are shown on FIG. 10 (801-804). The active COMs and SEGs are addressed synchronously with bipolar pulses of equal amplitude (½ $V_{select}$) but opposite sign (805-808), where $V_{select}$ is the highest amplitude occurring in the standard ZBD drive scheme.

For example, pulse pairs 805|807 and 806|808 have inverted polarity and floating voltage levels 801 and 802 drift in the same direction as pulses 808 and 807, respectively. The resultant signal profile across C1 [SEG1–COM1], a selected pixel, has a selection pulse 811 of equal amplitude to the standard ZBD addressing scheme shown in column 2, while the second pulse 812, which must be below the threshold for impacting the liquid crystal state, is even lower than in the standard ZBD addressing scheme.

Similarly, the resultant signal profile across C4 [SEG1–COM1], a non-selected pixel has two pulses that are both lower than the higher pulse in the standard ZBD addressing scheme, which must be below the threshold of impacting the liquid crystal state. The maximum amplitude of the resultant signal of a non-select pixel (813, 814) is now reduced to below ½ $V_{select}$, which is lower than the non-select voltage ($V_{nonselect}$) under standard ZBD addressing.

The sign of the FLOAT potential is the important factor here. If the magnitude of the FLOAT potential is higher than that determined from FIG. 10, then the performance will be improved further.

Figure 11:
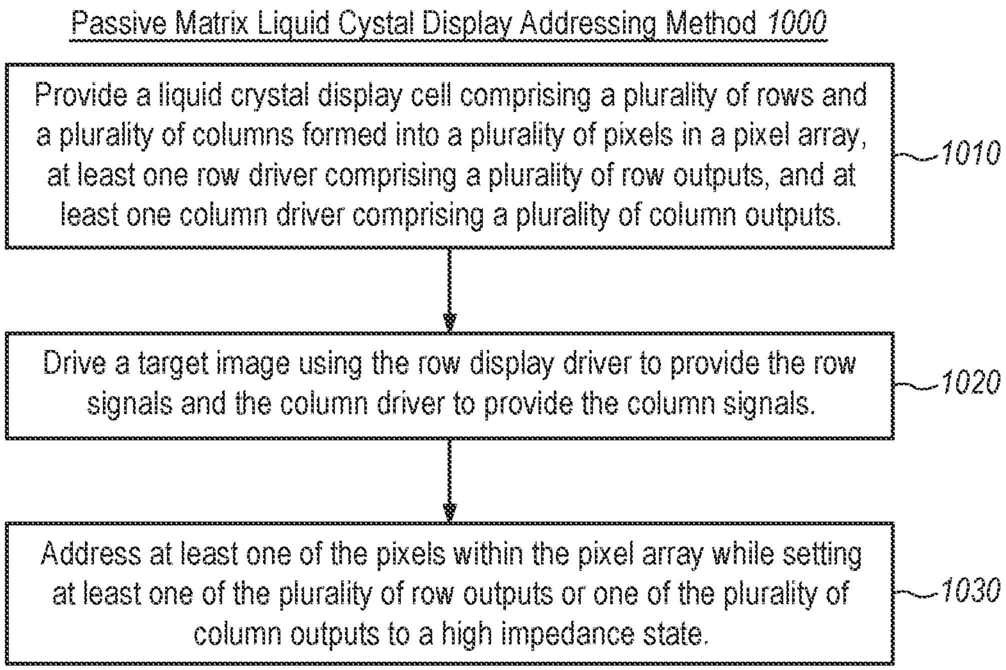
FIG. 11 shows an example embodiment of a method of passive matrix liquid crystal display addressing.

FIG. 11 shows passive matrix liquid crystal display addressing method 1000. Starting at step 1010, a liquid crystal display cell comprising a plurality of rows and a plurality of columns is provided wherein the plurality of rows and the plurality of columns are arranged to form a plurality of pixels within an array, at least one row driver comprising a plurality of row outputs is provided, and at least one column driver comprising a plurality of column outputs is provided. Then, at step 1020, a target image is driven using the row display driver to provide the row signals and the column driver to provide the column signals. And, at step 1030, at least one of the plurality of pixels within the array is addressed, while at least one of the plurality of row outputs or one of the plurality of column outputs is set to a high impedance state.

In an alternative embodiment, the row driver and the column driver in step 1020 can be integrated into a display driver. In a further embodiment, at least a portion of the non-addressed plurality of row outputs at step 1030 assume a high impedance state. In a further embodiment, at least a portion of the plurality of column outputs assume a high impedance state when at least one row is addressed at step 1030. In a further embodiment, at least a portion of the non-selected plurality of row outputs and at least a portion of the plurality of column outputs assume a high impedance state during step 1030. In a further embodiment, the row signals and column signals are selected to address a zenithal bi-stable display or a cholesteric liquid crystal display. In a further embodiment, passive matrix liquid crystal display addressing method 1000 further comprises providing an external stimulus and selecting a high impedance state based on the external stimulus, which in one embodiment is an environmental operating parameter such as temperature or how much charge is left in a battery.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. A method of addressing a passive matrix liquid crystal display comprising:

providing a plurality of pixels, wherein the plurality of pixels is arranged into a plurality of rows and a plurality of columns to form an array, and wherein each pixel in the plurality of pixels comprises a plurality of liquid crystal molecules, and wherein an electric signal applied to one of the plurality of rows and one of the plurality of columns creates an electric field across plurality of liquid crystal molecules of each pixel in the plurality of pixels at an intersection of the one of the plurality of rows and the one of the plurality of columns;

providing a row driver comprising a plurality of row outputs;

providing a column driver comprising a plurality of column outputs;

outputting a row signal on at least one of the plurality of row outputs;

outputting a column signal on at least one of the plurality of column outputs;

driving a target image using the row signal and the column signal;

setting at least one of the plurality of row outputs or at least one of the plurality of column outputs to a high impedance state wherein when the at least one of the plurality of row outputs is in the high impedance state, the at least one of the plurality of row outputs is isolated from the row driver and when the at least one of the plurality of column outputs is in the high impedance state, the at least one of the plurality of column outputs is isolated from the column driver; and addressing the passive matrix liquid crystal display by applying a voltage to at least one of the plurality of pixels within the array.

2. The method of addressing a passive matrix liquid crystal display of claim 1, wherein the row driver and the column driver are integrated into a display driver.

3. The method of addressing a passive matrix liquid crystal display of claim 1, wherein at least one of the plurality of row outputs assumes a high impedance state when at least one column is addressed.

4. The method of addressing a passive matrix liquid crystal display of claim 1, wherein at least one of the plurality of column outputs assumes a high impedance state when at least one row is addressed.

5. The method of addressing a passive matrix liquid crystal display of claim 1, wherein at least one of the plurality of row outputs and at least one of the plurality of column outputs assume a high impedance state when at least one row is addressed.

6. The method of addressing a passive matrix liquid crystal display of claim 1 further comprising:

applying a positive voltage and a negative voltage to the plurality of rows and the plurality of columns, and applying a voltage reduction to reduce the required active row and column voltage swing.

7. The method of addressing a passive matrix liquid crystal display of claim 1, wherein the passive matrix liquid crystal display is a zenithal bi-stable display.

8. The method of addressing a passive matrix liquid crystal display of claim 1, wherein the passive matrix liquid crystal display is a cholesteric liquid crystal display.

9. The method of addressing a passive matrix liquid crystal display of claim 1 further comprising:

providing an external stimulus; and selecting a high impedance state based on the external stimulus.

10. The method of addressing a passive matrix liquid crystal display of claim 9, wherein the external stimulus is an environmental operating parameter.

11. A low power passive matrix liquid crystal display comprising: a plurality of pixels, wherein:

the plurality of pixels is arranged into a plurality of rows and a plurality of columns to form an array;

each pixel in the plurality of pixels comprises a plurality of liquid crystal molecules, and an electric signal applied to one of the plurality of rows and one of the plurality of columns creates an electric field across plurality of liquid crystal molecules of each pixel in the plurality of pixels at an intersection of the one of the plurality of rows and the one of the plurality of columns;

a row driver comprising a plurality of row outputs, wherein the row driver outputs a row signal on at least one of the plurality of row outputs;

a column driver comprising a plurality of column outputs, wherein the column driver outputs a column signal on at least one of the plurality of column outputs;

wherein at least one of the plurality of row outputs or one of the plurality of column outputs assumes a high impedance state while applying a voltage to at least one of the plurality of pixels within the array to address the low power passive matrix liquid crystal display; and wherein when the at least one of the plurality of row outputs is in the high impedance state, the at least one of the plurality of row outputs is isolated from the row driver and when the at least one of the plurality of column outputs is in the high impedance state, the at least one of the plurality of column outputs is isolated from the column driver.

12. The low power passive matrix liquid crystal display of claim 11, wherein the plurality of row drivers and the plurality of column drivers is an integrated row and column driver.

13. The low power passive matrix liquid crystal display of claim 12, wherein the integrated row and column driver further comprises an integrated display controller.

14. The low power passive matrix liquid crystal display of claim 11, wherein the low power passive matrix liquid crystal display is a bi-stable display.

15. The low power passive matrix liquid crystal display of claim 11, wherein the low power passive matrix liquid crystal display is a multi-stable display.

16. The low power passive matrix liquid crystal display of claim 11, wherein the low power passive matrix liquid crystal display is a zenithal bi-stable display.

17. The low power passive matrix liquid crystal display of claim 11, wherein the low power passive matrix liquid crystal display is a cholesteric liquid crystal display.

18. The low power passive matrix liquid crystal display of claim 11, further comprising:

a plurality of modes of operation selected from the group consisting of high impedance row addressing, high impedance column addressing, high impedance row and column addressing, and standard no high impedance addressing; and wherein the plurality of modes of operation are selected based on an external stimulus.

19. The low power passive matrix liquid crystal display of claim 18, wherein the external stimulus is an environmental operating parameter.

20. A liquid crystal display driver for a passive matrix liquid crystal display comprising:

a row driver comprising a plurality of row outputs;

a column driver comprising a plurality of column outputs;

wherein at least one of the plurality of row outputs or one of the plurality of column outputs assumes a high impedance state while addressing a low power passive matrix liquid crystal display; and wherein when the at least one of the plurality of row outputs is in the high impedance state, the at least one of the plurality of row outputs is isolated from the row driver and when the at least one of the plurality of column outputs is in the high impedance state, the at least one of the plurality of column outputs is isolated from the column driver.

21. The liquid crystal display driver for the low power passive matrix liquid crystal display of claim 20 further comprising:

an integrated display controller.

22. The liquid crystal display driver for the low power passive matrix liquid crystal display of claim 20 further comprising at least two selectable modes of operation for determining whether high impedance addressing is used for rows, columns, rows and columns, or neither rows nor columns.

* * * * *